United States Patent [19]
van den Nieuwelaar et al.

[11] Patent Number: 5,176,563
[45] Date of Patent: Jan. 5, 1993

[54] METHOD AND DEVICE FOR SEPARATING THE LEGS FROM A BODY PART OF SLAUGHTERED POULTRY

[75] Inventors: Adrianus J. van den Nieuwelaar, Gemert; Petrus C. H. Janssen, Wilbertoord, both of Netherlands

[73] Assignee: Stork PMT B.V., Handelstratt, Netherlands

[21] Appl. No.: 707,678

[22] Filed: May 30, 1991

[30] Foreign Application Priority Data

May 31, 1990 [NL] Netherlands .................. 9001246

[51] Int. Cl.⁵ .................................................. A22C 7/00
[52] U.S. Cl. ................................... 452/166; 452/167; 452/170
[58] Field of Search .................... 452/166, 167, 170

[56] References Cited

U.S. PATENT DOCUMENTS

| | | | |
|---|---|---|---|
| 4,016,624 | 4/1977 | Martin et al. | 17/11 |
| 4,102,014 | 6/1978 | Martin et al. | 17/11 |
| 4,271,561 | 6/1981 | Lewis | 17/11 |
| 4,385,421 | 5/1983 | Martin | 17/52 |
| 4,480,353 | 11/1984 | Martin et al. | 17/11 |
| 5,080,630 | 1/1992 | Tieleman et al. | 452/170 |

FOREIGN PATENT DOCUMENTS

369544 11/1989 European Pat. Off. .
8303683 10/1983 Netherlands .

Primary Examiner—Bruce M. Kisliuk
Assistant Examiner—Lawrence Cruz
Attorney, Agent, or Firm—Hurt, Richardson, Garner, Todd & Cadenhead

[57] ABSTRACT

A method and device for separating the legs from a carcass of slaughtered poultry in which the carcass is positioned on the rear side, legs pointing upwards, relative to the cutters, a groin incision is made between each leg and the carcass at the side of the leg facing the carcass, and each leg is dislocated at the hip joint by pressing out each leg relative to the carcass. After dislocating the hip, a caudal hip incision is made in the remaining tissue connection between each leg and the carcass, after the two parts of each dislocated hip joint are moved a certain distance apart by applying a force acting on the hip joint ball of each hip joint, pushing the hip joint ball away from the hip joint socket prior to making the hip incision, and the legs are pulled off the carcass, essentially in the lengthwise direction of the back bone and away from the tail part.

15 Claims, 9 Drawing Sheets

METHOD AND DEVICE FOR SEPARATING THE LEGS FROM A BODY PART OF SLAUGHTERED POULTRY

BACKGROUND OF THE INVENTION

This present invention relates to a method for separating the legs from a body part of slaughtered poultry, comprising the following processing steps: positioning the carcass part, formed by the body part and the legs, relative to incision devices; making a groin incision between each leg and the body part at the side of the leg facing the body part; dislocating each leg in the hip joint by bending or pressing out each leg relative to the body part; making a back incision between each leg and the body part, on the rear side of the body part in the lengthwise direction of the backbone; and pulling the legs off the body part, essentially in the lengthwise direction of the backbone and in the direction away from the tail part. The invention also relates to a device for carrying out this method.

DISCUSSION OF THE PRIOR ART

A method and device for separating the legs from a body part of slaughtered poultry are known from U.S. Pat. No. A-4,385,421. At the feed side of the device a body part with legs of a slaughtered bird is placed by hand on the top side of an endless chain in such a way that the body part rests on the belly side and the legs are directed downwards. By means of barbed protuberances provided on it, the chain, which is driven, pushes the carcass part along at a certain speed through the device, the tail being directed in the direction of movement of the chain. During this, the groin incision is made first of all at both legs at the bottom side of the carcass part. The legs are then bent out laterally upwards by means of a pair of helical rollers disposed at an acute angle to the lengthwise direction of the chain, in the process of which the hip joints are dislocated, after which the legs are gripped at the tarsal joints and moved along by a second pair of helical rollers set up parallel to the lengthwise direction of the chain. Just before the start of the second pair of helical rollers the back incisions are made by cutters placed above the chain. The speed of advance of the tarsal joints is lower than that of the body part on the chain, so that the body part and the legs are pulled apart, and the connection between them is broken. The pulling off of the legs thus takes place essentially in the lengthwise direction of the backbone, in the direction away from the tail part. The parts of the bird obtained in the manner described above, viz. a body part and two separate legs, including the so-called "oysters", are collected at the discharge side of the device and processed further.

In the first place, in operating the known device a problem is caused by the fact that only a groin incision is made at each leg prior to the pulling off of the legs from the body part. This incision cannot be deeper than to just in front of the thigh bone, since with a deeper incision there is a risk of the bone being touched and bone splinters thereby going into the meat. This is inadmissible from the point of view of quality and would necessitate an expensive check for the presence of these splinters. As a result of the groin incision, a large part of the tissue connections between body part and legs therefore remains intact. When the legs are being pulled off the body part, these tissue connections are broken, and an appreciable quantity of meat can remain behind on the body part, making the legs produced less valuable.

Another disadvantage is that the carcass parts are fed by hand to the known device on their belly side with the legs hanging down. For bending out of the legs, for the purpose of separating the legs from the body part, it is consequently necessary to move the legs in the upward direction, for which operation helical rollers are used. The use of these helical rollers, which have to be driven in such a way that the horizontal component of the axial movement of the helical roller rib is essentially equal to the speed of the conveyor chain, requires a complex drive and is expensive.

SUMMARY OF THE INVENTION

The object of the invention is largely to eliminate the above-mentioned disadvantages and to that end to provide a method by which a leg with as large as possible a quantity of meat, containing the oyster, can be obtained in a simple manner.

This object is attained according to the invention by, after dislocating of the hip, making a hip incision in the remaining tissue connection between each leg and the body part.

The dislocating of the hip joint produces space between the hip joint ball on the thigh bone and the hip joint socket in the body part. This space can advantageously be used for making the hip incision, so that prior to the pulling off of the legs from the body part the major part of the tissue connections between them is broken in a controlled manner.

The hip incision is preferably caudal (i.e. in the direction of the tail) and extends as far as the periosteum of the ischial bone.

Positioning of the carcass part in such a way that the rear side is down and the legs point upwards means that advantage can be taken of the force of gravity acting on the legs when the dislocated joints are being severed from the body part, in which process the legs are moved downward.

It is common in mechanised slaughterhouses to carry out operations on slaughtered birds while the carcass parts are hanging by the legs in a conveyor along which the are conveyed from one processing station to the next. On account of the position of the carcass parts, the method according to the invention is therefore particularly suitable for use in an automated slaughter line.

Differences in structure occur between body parts and legs of different birds, even if these birds have been reared in the same period and in the same circumstances. It is therefore preferable, prior to the making of a hip incision, to move the two parts of each dislocated hip joint apart over a certain distance. This not only produces more space for the incision and less risk of touching bone parts, but in this way the tissue to be cut through is also pre-tensioned, which facilitates the cutting operation.

A device according to the invention for carrying out the method according to the invention comprises positioning devices for positioning the body part and the legs of the carcass part relative to incision means; groin incision means for making the groin incisions; leg dislocation means for dislocating each leg in the hip by means of bending out or pressing out; back incision means for making the back incisions; pull-off means for pulling the legs off the body part; and hip incision means for making the hip incisions.

The body part positioning and leg positioning means are preferably designed for receiving a carcass part positioned on its back.

A preferred embodiment of the device according to the invention is provided with a conveyor for bringing in carcass parts hanging by the legs, a guide channel disposed below the conveyor and running parallel thereto for the rear side of the body part, which guide channel in the direction of conveyance merges into a guide face above which at a certain distance a conveyor chain can move in the direction of conveyance, past the end of the conveyance by the conveyor, groin incision means which are fitted on either side of the vertical plane of symmetry of the conveyor chain, leg push-out strips which are fitted on either side of the said plane of symmetry, downward running leg guides diverging laterally in the direction of conveyance, behind which guides hip incision means and back incision means are provided on either side of the guide face, and a plate chain which can move below the guide face in the direction of conveyance at a higher speed than the conveyor chain moved along above it, the plates of the plate chain being provided with V-shaped recesses at the side lying in the direction of conveyance.

It will be clear to a person skilled in the art that where a conveyor chain is mentioned a cord or belt provided with suitable drivers can also be meant.

Further advantageous embodiments of the device according to the invention are described in claims 8-12.

When during operation of the device the conveyor chain engages with the inside of the body part of the carcass part, the body part with the legs is moved along by the device in the direction of conveyance. The driving along by the conveyor chain produces sufficient force to make the above-mentioned incisions by means of stationary incision means, to dislocate the legs in the hip joints, and to guide the legs lateally along the leg guides.

In the device the legs have to be bent downwards laterally from an originally upward pointing position. The leg guides provided for this may comprise simple bars and/or strips, and are cheap.

After the making of the hip incisions, the plates of the plate chain grip the legs near the tarsal joints and—thanks to the difference in speed between the conveyor chain moving the body part along and the plate chain pulling along the legs—pull the legs off the body part. The legs can then be unloaded from the plate in question or transferred to a conveyor for further processing; the body part can also be discharged mechanically or by hand for further processing.

In order to improve the positioning of the carcass part during the making of the groin incisions, it is advantageous to make the guide channel in the form of a double guide plate chain moving along at the same speed as the conveyor. This ensures that the body part arrives in a controlled position on the guide face at the groin incision means, as a result of which the groin incisions are made in the optimum manner.

A critical point in the device is the synchronisation between the different conveyance mechanisms situated in it, in particular between the movement of the conveyor chain and the faster movement of the plate chain at the discharge side of the device. In order to have sufficient length of run available in all circumstances, the device would have to be relatively long; the plates placed some distance from each other can grip the legs at an early stage or not until later. In order to solve this problem and to be able to build a relatively short device, two conveyor chains are fitted in series above the guide face, with a space between them. If this space between them is placed above the plate chain, the body part provided with all incisions and with the legs hanging down will hang still on the guide face after leaving the first conveyor chain until the legs are gripped by a plate of the plate chain, which pulls the body part by the legs over the guide face to the second conveyor chain, which will slow down the movement of the body part relative to the plate chain.

For driving the body part along by the conveyor chains without jamming, said chains may be in the form of spiked chains, and between two adjacent spikes they may be provided with small plates disposed at right angles to the direction of conveyance. During conveyance of the body part the plates fall between protuberances on the inside of the back of the body part, as a result of which the grip of a spiked chain on the body part is very good.

On the outside of the back of the body part there is an outward projecting crest which runs in the direction of conveyance and is part of the backbone. This crest is used for centring of the body part by guiding the crest in a centring slit of the guide face.

The claims and many of the attendant advantages will be more readily appreciated as the same becomes better understood by reference to the following detailed description and considered in connection with the accompanying drawings in which like reference symbols designate like parts.

DESCRIPTION OF THE DRAWINGS

FIG. 8 shows in perspective details on a larger scale of the caudal incision means and the back incision means;

DESCRIPTION OF THE PREFERRED EMBODIMENT

Figure 1:
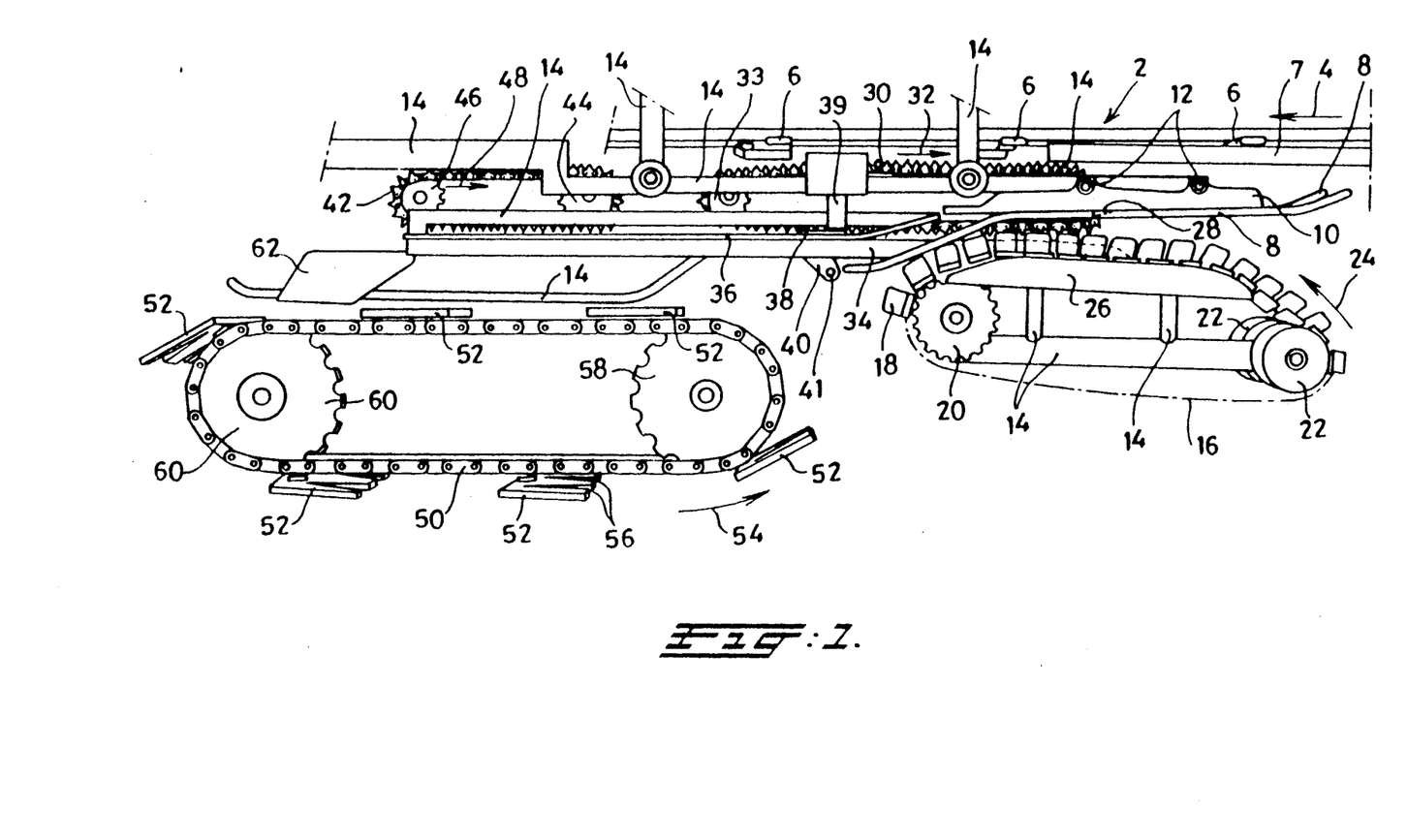
FIG. 1 is a side view in perspective of the essential parts of the device.

FIG. 1 shows a device through which a carcass part passes from the righthand side to the lefthand side. The carcass part is moved along, hanging by the legs on a conveyor 2, in the direction of arrow 4 by means of double hooks 6 which are connected to a drive chain at regular intervals from each other. The design of such a conveyor unit is known per se and is not explained any further here. What is important is that from the end of a leg conveyance guide strip 7 the conveyor 2 can no longer hold the legs in the outward direction.

Next, viewed in the direction of conveyance 4, two leg guide bars 8 are disposed symmetrically relative to the vertical central longitudinal plane of the device, and in the direction of conveyance 4 diverge sideways and run downwards. Their purpose is to go between the legs hanging next to each other and press them sideways on the inside of each leg away from each other. Between the leg guide bars 8, and running parallel thereto, two leg push-out strips 10 are fixed symmetrically relative to the central longitudinal plane of the device by means of bolts 12 on a frame 14 bearing the parts of the device. For the sake of clarity, large parts of the frame are not shown in this FIGURE and the FIGURES following, but it goes without saying that all parts are supported at suitable places in a suitable manner by the frame, or are mounted in the frame.

Disposed below the leg guide bars 8 are two parallel endless plate chains which are a mirror image of each other relative to the above-mentioned central longitudinal plane of the device. The plate chain 16 shown in FIG. 1 is constructed of plates 18 which are coupled to each other at right angles to the plane of drawing, and which are flanged at an acute angle. The two plate chains thus together form an essentially V-shaped channel below the conveyor 2 and moving along with it when they are driven by means of a sprocket wheel 20 and move via a track wheel 22 in the direction of the arrow 24 over a guide 26.

Situated above the plate chains and below the conveyor 2 in the central longitudinal plane is an endless spiked chain 30 which can move in the direction of the arrow 32 around two sprocket wheels, of which only sprocket wheel 33 is visible and is driven. The spiked chain 30 runs above a guide face formed by the top face of a body guide bar 34. The bottom side of the spiked chain 30 begins above a virtually horizontal part of the plate chain 16 and also at a point which, viewed in the direction of conveyance 4, lies just before the end of the leg conveyance guide strip 7.

Just before the beginning of the spiked chain 30, two groin incision cutters 28 are disposed between the leg push-out strips 10, symmetrically relative to the central longitudinal plane.

Above the zone where the leg guide bars 8 are bent downwards lies the beginning of joint ball guide strips 36, which are initially also bent downwards, but otherwise run horizontally.

Four cutters are set up after the transition from the downward bent part to the horizontal part of the joint ball guide strips 36: for each leg a cutter cutting inwards in the horizontal direction, which below will be called a caudal incision cutter 38, and a cutter cutting upwards in the vertical direction, which below will be called a back incision cutter 40. Each caudal incision cutter 38 is pivotable about a pin 39, and the cutting edge of said cutter is pressed in the direction of the central longitudinal plane by a spring which is not shown. Each back incision cutter 40 is pivotable about a pin 41, and the cutting edge of said cutter is pressed in the direction of the spiked chain by a spring which is not shown. Further details of the cutters 38 and 40 are shown below in and discussed with reference to FIG. 8.

A second endless spiked chain 42 is disposed above the body guide bar 34, in line with spiked chain 30 and with some space between them. The spiked chain 42 also rotates over two sprocket wheels 44 and 46, one of which drives the chain in the direction of arrow 48.

A second plate chain 50, on which plates 52 are fixed at regular intervals, is disposed below the body guide bar 34 and the spiked chain 42 in the central longitudinal plane of the device. Each plate 52 is provided, at the edge facing the direction of movement 54 of the plate chain 50, with two V-shaped recesses 56, the purpose of which is to grip the legs of the carcass part to be processed by the device. The movement of the plate chain 50 can be obtained by driving one of the two sprocket wheels 58 and 60 over which the plate chain runs.

Fitted at the end of the bottom side of the second spiked chain 42, in line with the body guide bar 34, a bent plate 62 with a V-shaped cross-section is provided, which plate serves as a discharge plate for body parts from which the legs have been separated.

The parts of the device, the correct position of which depends on the dimensions of the birds to be processed, are provided with adjusting devices to permit adjustment to the dimensions.

The operation of the device according to the invention is discussed below with reference to FIGS. 2-12.

Figure 2:
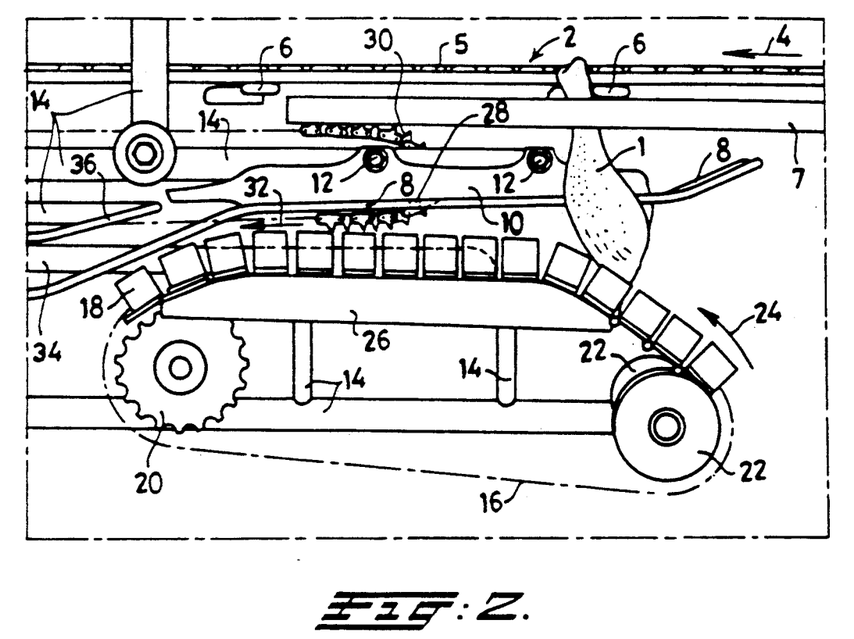
FIGS. 2 and 3 are side views in perspective of the feed section of the device, to illustrate operations carried out in succession by the device on the carcass part of the feed section of the device.

In FIG. 2 a carcass part 1, hanging by the legs from a double hook 6, is moved along a conveyor 2 by means of a conveyor chain 5 coupled to the hooks 6. The legs of the carcass part 1, which is shown in side view, are here pressed outwards by the leg guide bars 8 and leg push-out strips 10, which are formed in such a way that they go on the inside of the legs during the conveyance. From the position shown in FIG. 2 the carcass part 1 is moved along, both by the hook 6 at the tarsal joints, and by the plate chain 16 at the back part. The carcass part 1 then comes up against an upward sloping edge of body guide bar 34 which takes the body part of the carcass part to the required height. The horizontal speed of the plate chain 16 is almost the same as that of hook 6, which makes the carcass part 1 land in a desired position at the beginning of the spiked chain 30. This situation is shown in FIG. 3.

Figure 3:
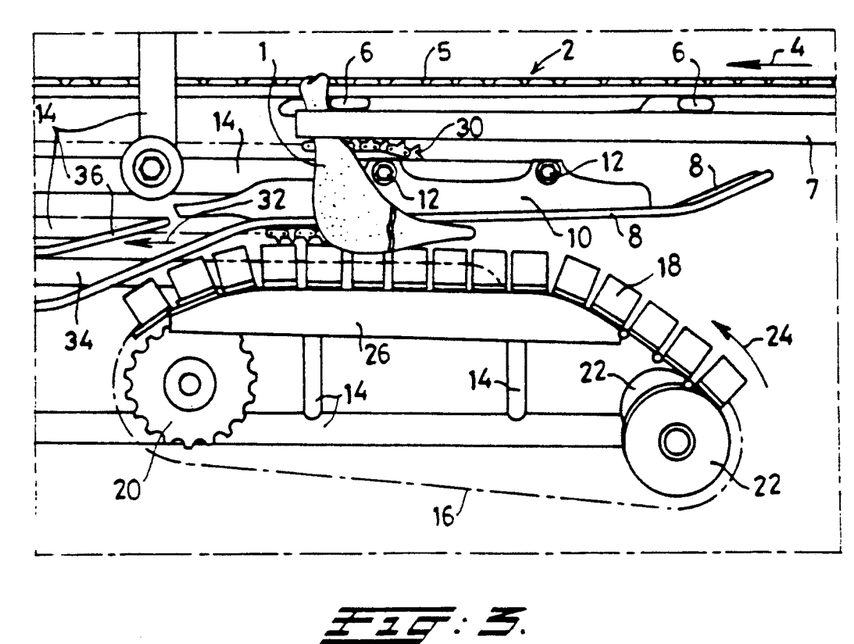

In FIG. 3, the body part of the carcass part 1, clamped between the bottom side of the spiked chain 30 and the top side of the body guide bar 34, is moved along by the spiked chain 30 moving in the direction 32, while a hook 6 guides the tarsal joints in the direction of conveyance 4. The horizontal speeds of the conveyor 2 and the spiked chain 30 virtually correspond.

It should be pointed out here that the difference always occurring in the leg length of one bird relative to another causes no problem at all in the case of the present invention, since the body part describes a specific path in the device and the incisions to be made are determined with regard to the body part. Thus, long legs will be pressed up by the body guide bar 34 through the opening of the double hook 6 by which they are being conveyed.

Figure 4:
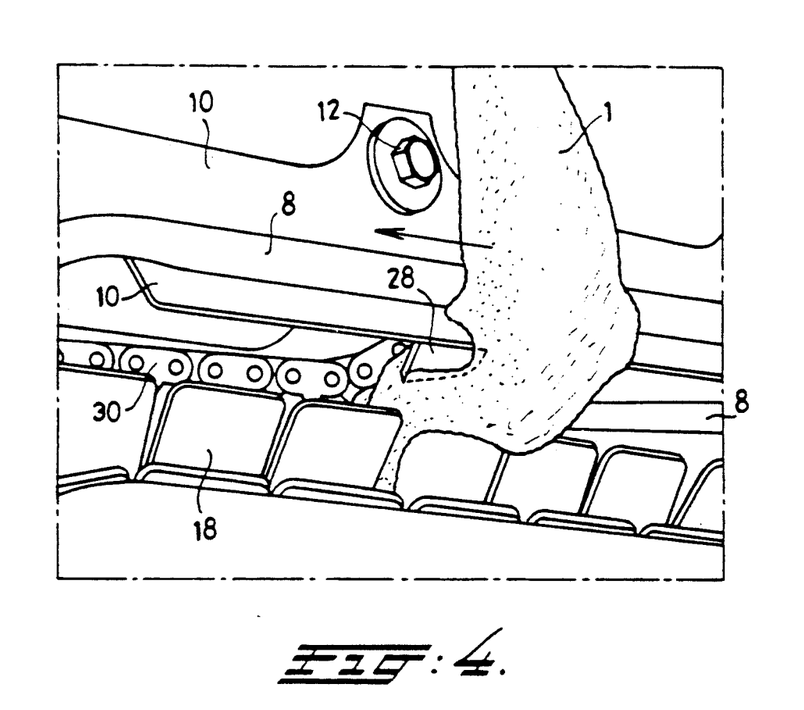
FIG. 4 shows in perspective a detail on a larger scale of the feed section of the device.

FIG. 4 shows in detail how a groin incision cutter 28 in the position of the carcass part 1 shown in FIG. 3 cuts through skin and tendons between a leg and the body part; the cutting edge of the cutter 28 coincides with the dashed line.

On continuation of the conveyance of the carcass part 1 by the spiked chain 30, after the position shown in FIG. 3, the leg push-out strips 10 together with the body guide bar 34 and the plate chain 16 exert such a force on the legs near the hip joint ball that the hip joints are dislocated, in other words, the hip joint ball on the end of the thigh bone is pressed out of the hip joint socket in the body part.

Figure 5:
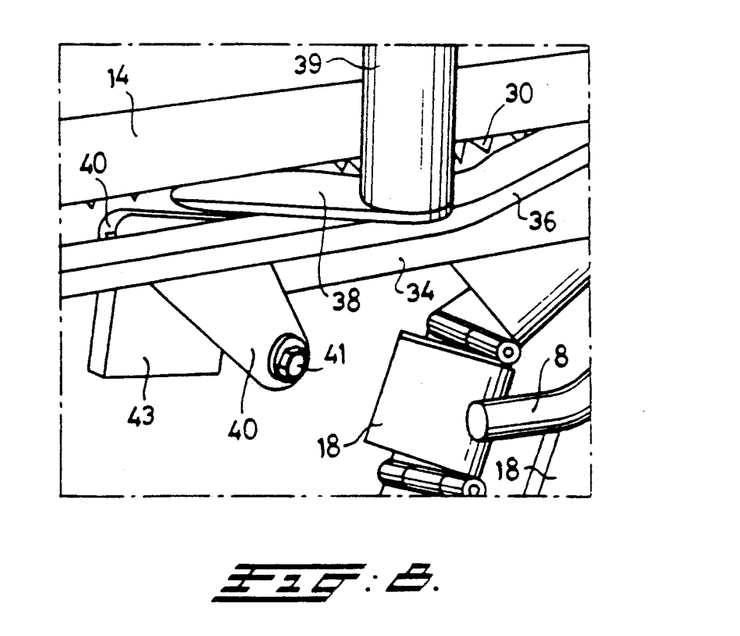
FIGS. 5, 6 and 7 are side views in perspective of a section of the device to illustrate further operations carried out in succession on the carcass part.

On further continuation of the conveyance of the carcass part the end of the leg conveyance guide strips 7 is reached, as a result of which the outward confinement of the legs ends. As a result of this, the legs are pressed outwards out of the hook 6 by the diverging leg guide bars 8, and they easily move to the side, also due to the force of gravity, the hip dislocations and the groin incisions made. This situation is shown in FIG. 5.

Figure 6:
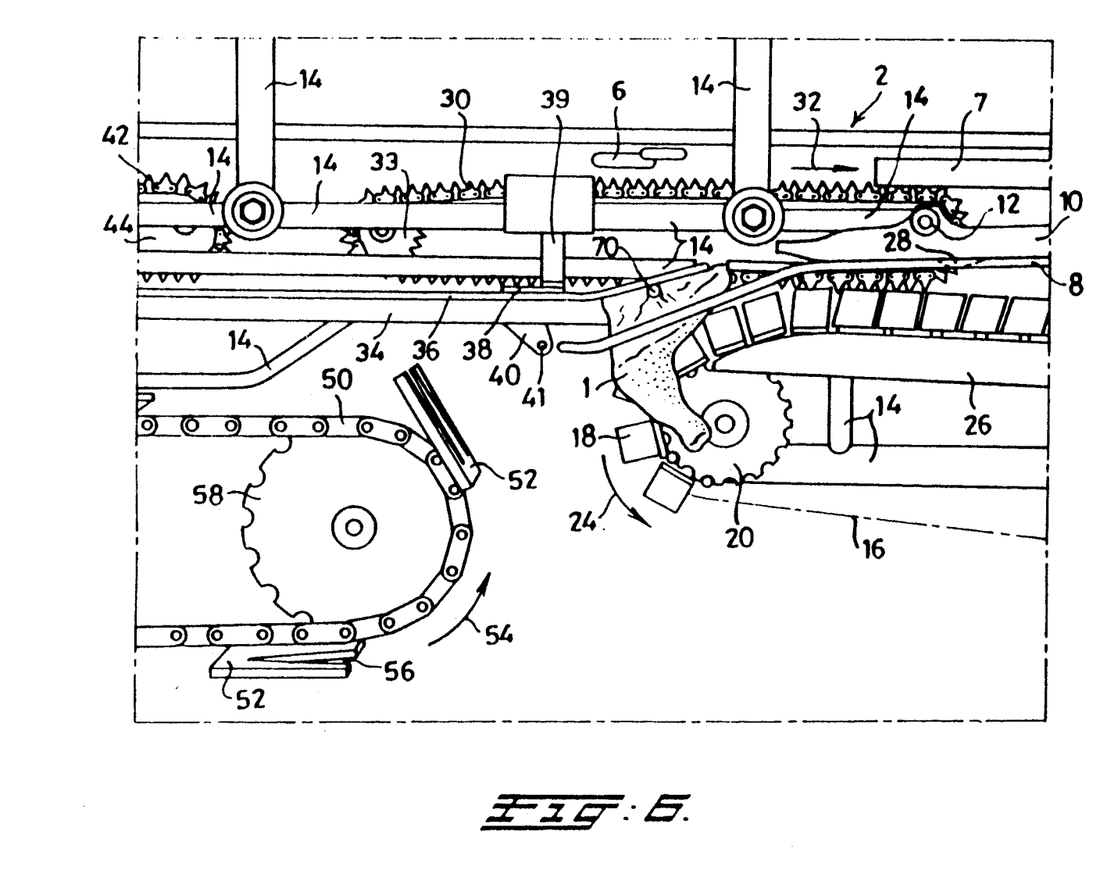

In further conveyance of the carcass part 1 by the spiked chain 30 over the essentially horizontally running body guide bar 34, the downward bent section of leg guide bars 8 bends the legs further outwards, with the result that the hip joint balls 70 project out of the meat. The legs are pointing downwards at this processing stage. The hip joint balls 70 subsequently come to rest under the joint ball guide strips 36, as shown in FIG. 6.

Figure 7:
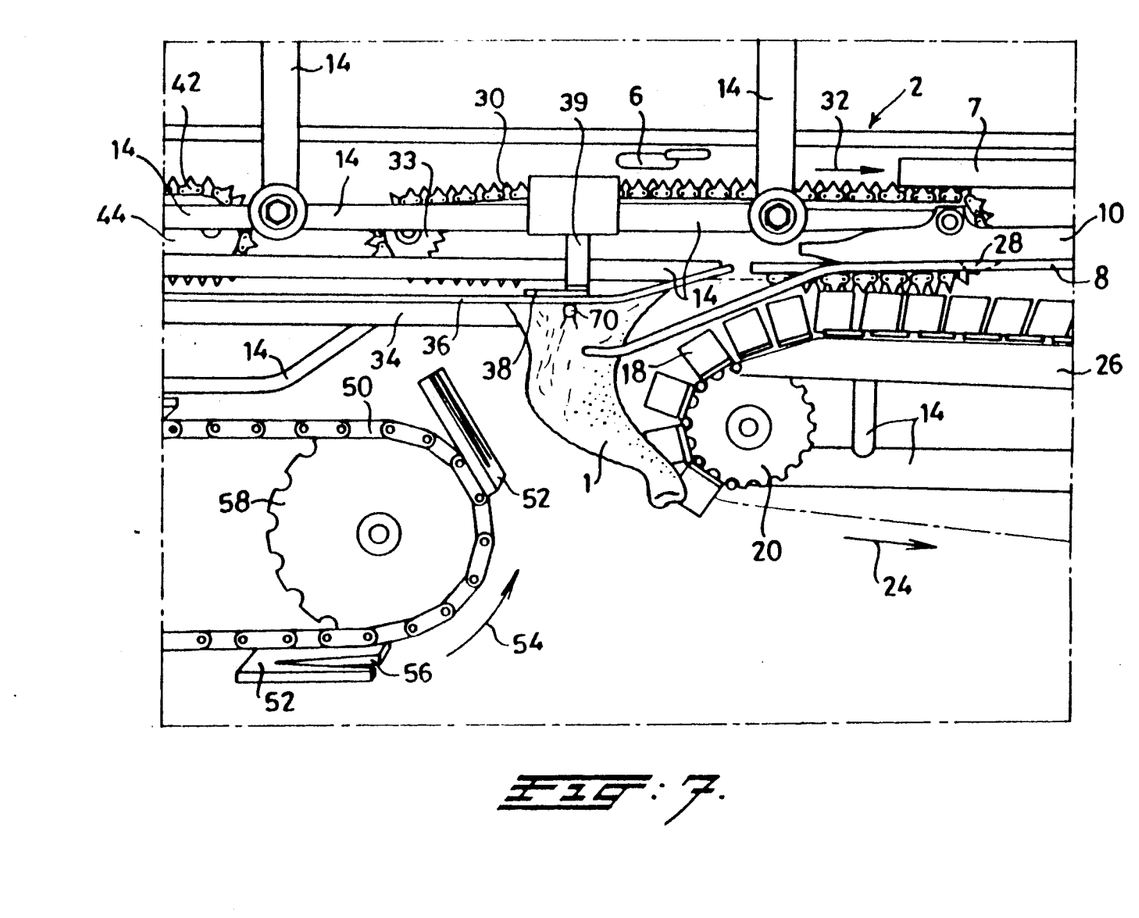

The downward running joint ball guide strips 36 press the hip joint balls downwards and thus cause the legs to finish up hanging in a virtually vertical position. In this position, which is shown in FIG. 7, the carcass part passes the caudal incision cutters 38 and the back incision cutters 40.

For the purpose of illustration of how the last-mentioned cutters operate, they are shown in detail in FIG. 8, leaving out the carcass part. The caudal incision cutters 38, the cutting edge of which is situated at the side of the spiked chain 30, thanks to the action of the joint ball guide strips 36 on the hip joint balls 70, cut past the dislocated hip joint through tendons between each leg and the body part. The back incision cutters 40, the cutting edge of which is also at the side of the spiked chain 30, cut through skin and membranes on either side of the crest-shaped thickened part on the rear side of the body part, which thickened part is centred relative to the cutters 40 by a groove (not shown) in the top side of the body guide bar 34. It is also possible to adjust the cutting depth of the cutters 40 by means of a movable block 43 fitted between the cutters 40. Of course, the body guide bar 34 is interrupted at the position of the cutters 40.

The forward driving of the carcass part 1 by means of the spiked chain 30 over the body guide bar 34 takes place after passing the cutters 38 and 40 until the spiked chain 30 runs up over sprocket wheel 33; the carcass part then comes to a standstill. This situation is shown in FIG. 9.

Figure 9:
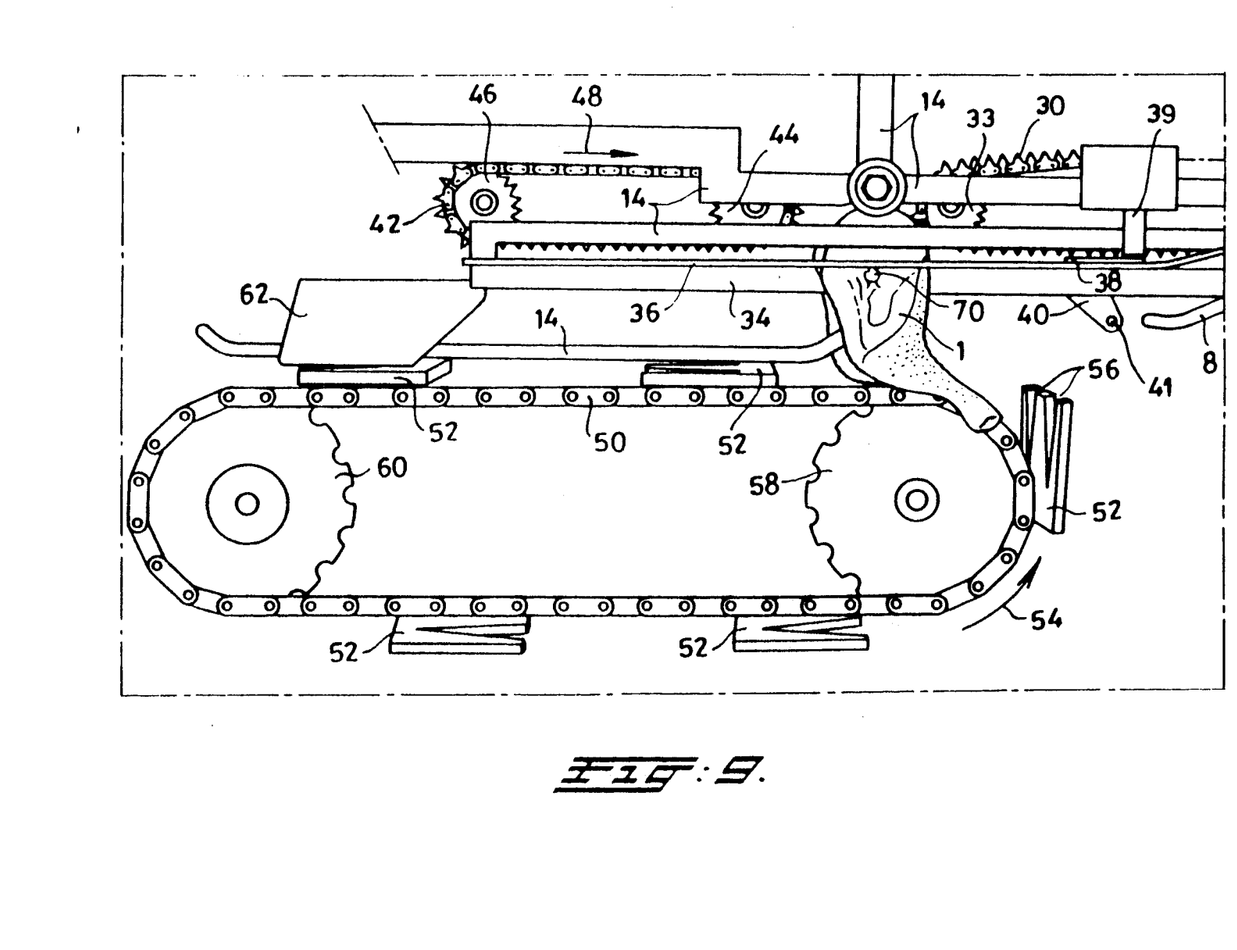
FIGS. 9, 10 and 11 are side views in perspective of a section of the device to illustrate further operations carried out in succession on the carcass part.
Figure 10:
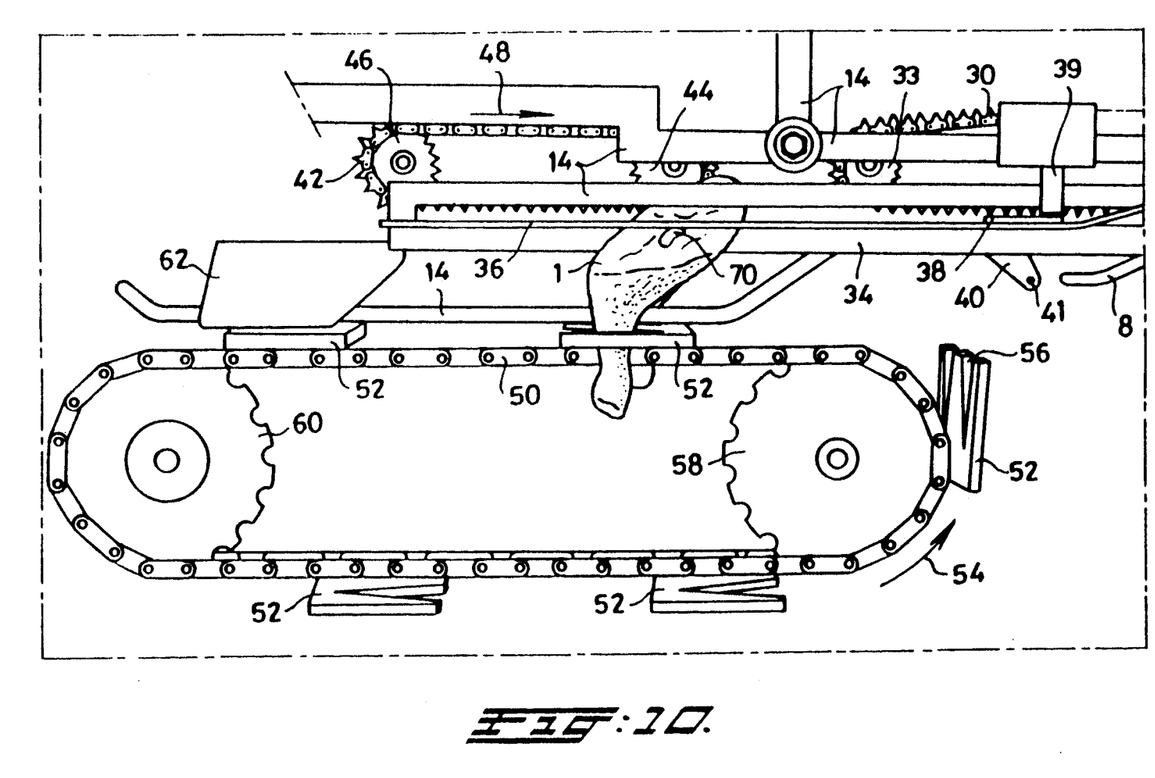
Figure 11:
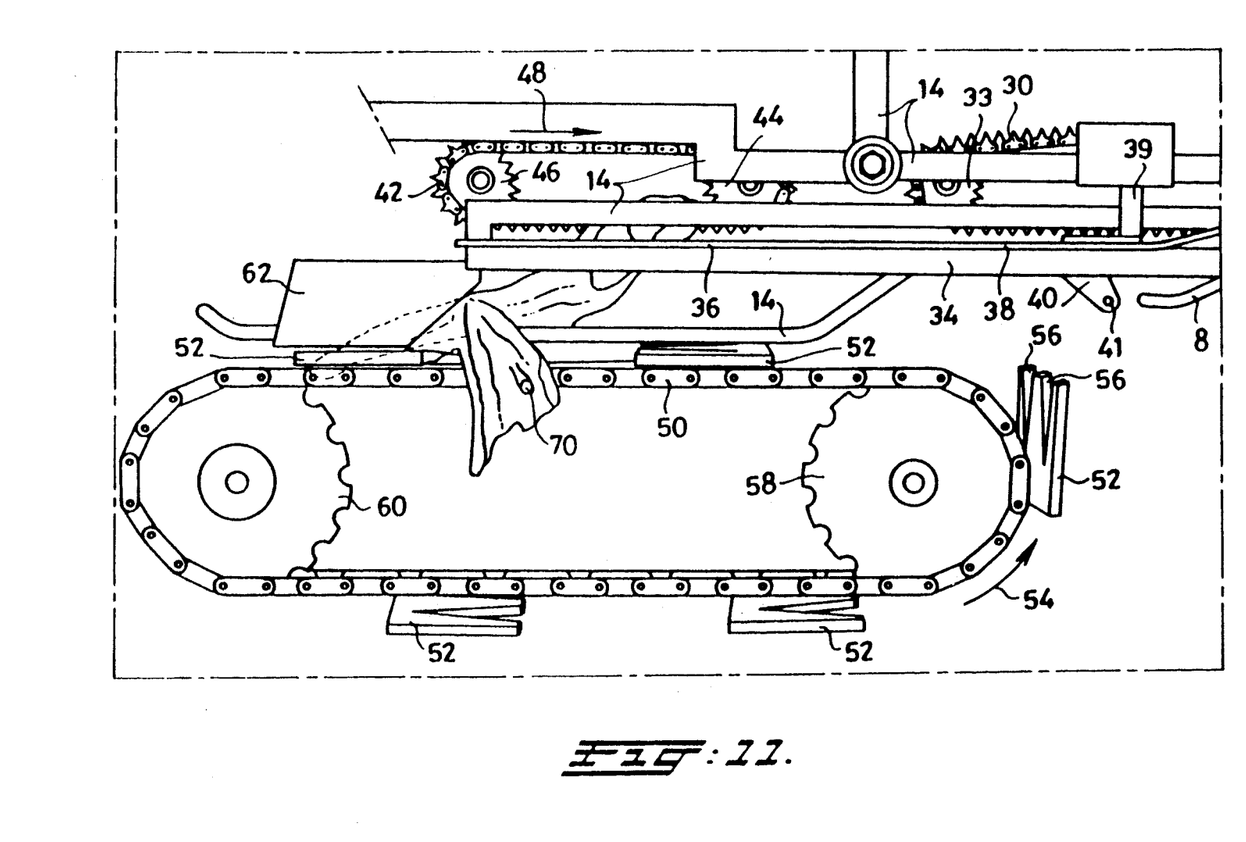

The legs of the stationary carcass part 1 hang in the situation shown in FIG. 9 on either side of the second plate chain 50 which moves in the direction 54. As a result of this movement, the V-shaped recesses 56 in the plates 52 of the plate chain 50 grip around a part of the legs of the carcass part 1 and thus pull the carcass part along over the body guide bar 34 until the body part comes into contact with the second spiked chain 42. This spiked chain moves in the vicinity of the body guide bar 34 in the same direction as the plate chain 50; the speed of the former is, however, considerably lower than the speed of the latter. Consequently, the legs carried along by a plate 52 are torn away from the body part slowed down by the spiked chain 42. FIG. 10 shows how one of the two legs is pulled away from the body part, while the other leg is on the point of being pulled away. The direction in which the legs are pulled off the body part is essential for obtaining the oysters together with the legs in all circumstances.

After pulling off of the legs, the body part is conveyed further by the spiked chain 42 until it arrives on the discharge plate 62, after which it leaves the device for further processing. The detached legs fall out of the recesses 56 on movement of the plate 52 around the sprocket wheel 60, following which they are collected outside the device and are processed further.

Figure 12:
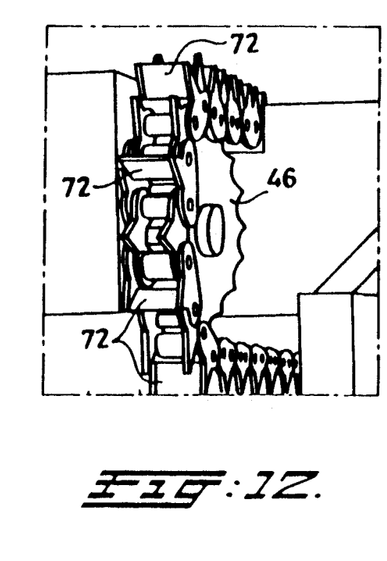
FIG. 12 shows in perspective details of the spiked chains used in the device.

FIG. 12 shows the way in which the links of the spiked chains 30 and 42 are formed. Plates 72 are fixed between the spikes of the outside links, at right angles to the lengthwise direction of the chain. When the body part of a carcass part moves forward, the plates 72 go between the protuberances on the inside of the body part in line with the backbone of the bird. The plates 72 thus ensure a slip-free forward driving or braking of the body part over the body guide bar 34 by means of the spiked chains 30 and 42, respectively.

While the invention has been described and illustrated in its preferred embodiment, it should be understood that departures may be made therefrom within the scope of the invention, which is not limited to the details disclosed herein.

What is claimed is:

1. A method for separating the legs from a body part of slaughtered poultry, comprising the following processing steps:
   positioning the carcass part, formed by the body part and the legs, relative to incision means;
   making a groin incision between each leg and the body part at the side of the leg facing the body part;
   dislocating each leg in the hip joint by bending or pressing out each leg relative to the body part;
   pulling the legs off the body part, essentially in the lengthwise direction of the backbone and in the direction away from the tail part; and after dislocating of the hip applying a force acting on the hip joint ball of each hip joint, pushing the hip joint ball away from the hip joint socket, and making a hip incision in the remaining tissue connection between each leg and the body part.

2. A method according to claim 1, wherein the hip incision is caudal and extends at most up to the periosteum of the ischial bone.

3. A method according to claim 1, wherein prior to the operations the carcass part is positioned on the rear side, with the legs pointing upwards.

4. A method according to claim 1, wherein the two parts of each dislocated hip joint are moved a certain distance apart prior to making the hip incision.

5. A device for separating the legs from a body part of slaughtered poultry, comprising:
   conveyor means for bringing in carcass parts comprising a body part and legs;
   body part positioning means for positioning the body part and the legs of the carcass part relative to the incision means;
   groin incision means for making groin incisions;
   leg dislocation means for dislocating each leg in the hip by means of bending out or pressing out;
   pull-off means for pulling the legs off the body part;
   hip incision means for making hip incisions; and
   means for applying a force acting on the hip joint ball of each hip joint, the force pushing the hip joint ball away from the hip ball socket.

6. A device according to claim 5, wherein the body part positioning and leg positioning means are designed for receiving a carcass part positioned on its back.

7. A device according to claim 6, comprising a conveyor for bringing in carcass parts hanging by the legs, a guide channel disposed below the conveyor and running parallel thereto for the rear side of the body part, which guide channel merges in the direction of conveyance into a guide face above which at a certain distance a conveyor chain can move in the direction of conveyance past the end of the conveyance by the conveyor, leg push-out strips for dislocating each leg in the hip, which strips are fitted on either side of the plane of symmetry of the conveyor chain, downward running leg guides diverging laterally in the direction of conveyance, and a plate chain for pulling the legs of the body part, which chain can move below the guide face in the direction of conveyance at a higher speed than the conveyor chain moved along above it.

8. A device according to claim 7, wherein the leg guides comprise joint ball guides which can push the joint ball of each dislocated hip joint over a certain distance away from the hip joint socket prior to the making of the hip incision.

9. A device according to claim 7, wherein the guide channel is formed by two parallel endless guide plate chains which can move at the same speed as each other and at approximately the same speed as the conveyor in the direction of conveyance.

10. A device according to claim 7, wherein two conveyor chains are disposed in series above the guide face, with a space between them which lies above the plate chain.

11. A device according to claim 7, wherein the conveyor chain is a spiked chain which is provided with connecting plates fitted at right angles to the direction of conveyance between two adjacent spikes.

12. A device according to claim 7, wherein the guide face has a centring groove running in the direction of conveyance for centring of the backbone.

13. A device according to claim 5, wherein said groin incision means are fitted on either side of the vertical plane of symmetry of the conveyor chain.

14. A device according to claim 13, wherein said hip incision means and said back incision means are located behind said leg guides and are provided on either side of said guide face.

15. A device according to claim 14, wherein the plates of said plate chain are provided with V-shaped recesses at the side lying in the direction of conveyance.

* * * * *